Oct. 10, 1961     J. C. GARRETT     3,003,587
HYDRAULIC BRAKE WITH POSITIVE LOCK
Filed Nov. 4, 1958
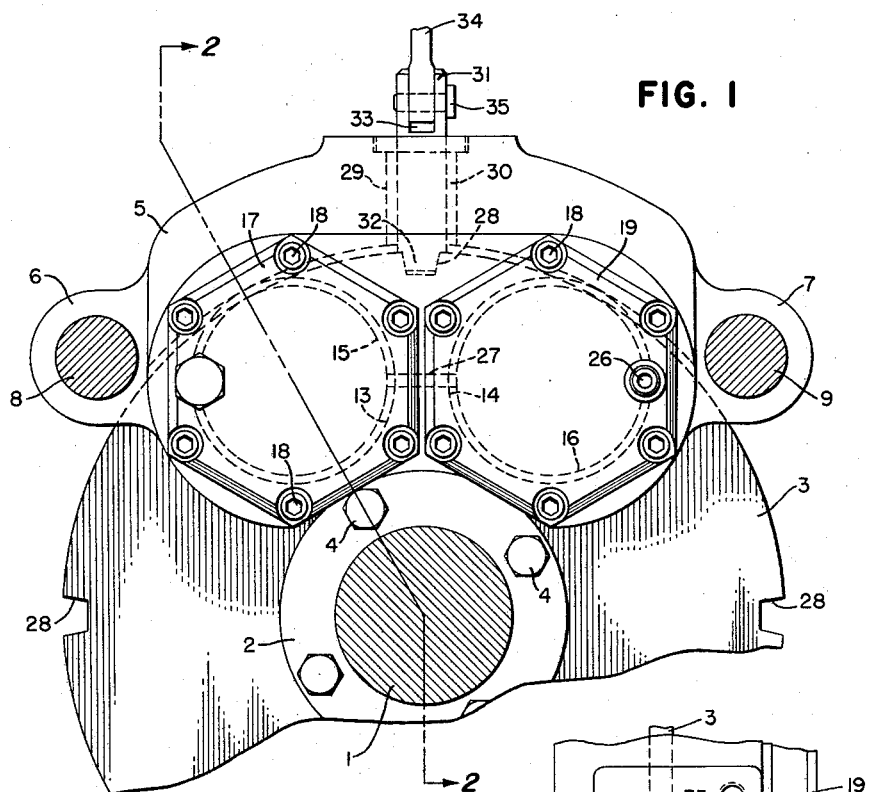
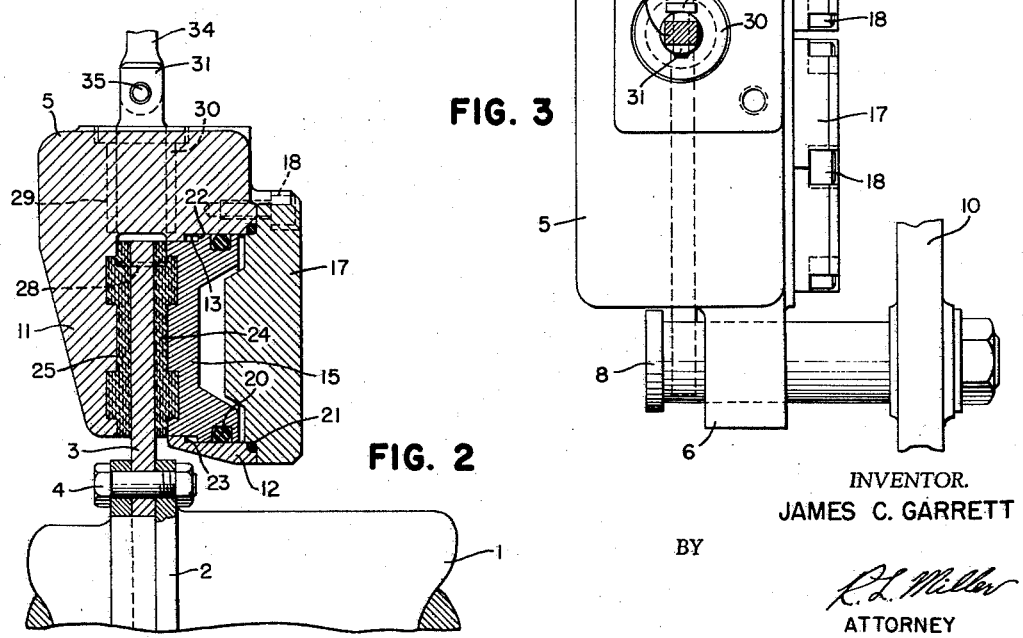
INVENTOR.
JAMES C. GARRETT
BY
*R. L. Miller*
ATTORNEY

United States Patent Office 3,003,587
Patented Oct. 10, 1961

3,003,587
HYDRAULIC BRAKE WITH POSITIVE LOCK
James C. Garrett, Canton, Ohio, assignor to The Goodyear Tire & Rubber Company, Akron, Ohio, a corporation of Ohio
Filed Nov. 4, 1958, Ser. No. 771,792
1 Claim. (Cl. 188—68)

This invention relates to disc brakes and is especially useful in the construction of single disc brakes where it is desired to positively lock the disc against rotation during parking of a vehicle on which the brake is mounted.

It is an object of the present invention to provide a single disc brake operated by hydraulic pressure with means for positively locking the disc against rotation.

Another object is to provide for using a single brake disc selectively as a friction element of the brake or as a locking element to positively lock the axle of a vehicle supporting the disc against rotation.

These and other objects will appear from the following description, reference being had to the accompanying drawings forming a part thereof.

Of the drawings,

FIG. 1 is a side view of a brake constructed in accordance with and embodying the invention, the axle being shown in section and the lock-operating rod being broken away.

FIG. 2 is a cross-sectional view thereof, taken on line 2—2 of FIG. 1;

FIG. 3 is a top view thereof, part of the hanger means being broken away.

Referring to the drawings, the numeral 1 designates a rotatable axle having a radial flange 2 to which a brake disc 3 is secured, as by bolts 4.

A non-rotatable brake member 5 is supported against rotation in a manner to permit it to float axially of the disc and for this purpose has a pair of ears 6, 7 slidably engaging a pair of parallel studs 8, 9 mounted on a non-rotatable hanger 10.

The non-rotatable brake member 5 is generally C-shaped in cross section axially of the disc and is made up of a limb portion 11 flanking one face of the brake disc and an opposing portion 12 flanking the opposite face of the disc and having a plurality of axially disposed cylinder bores 13, 14 formed therethrough. Pistons 15, 16 are fitted in the bores 13, 14 for movement toward and from the brake disc. The head end of the cylinder 13 is closed by a removable head 17 secured to the member 5 by screws 18. The cylinder 14 is similarly closed by a removable head 19. Each piston is sealed to its cylinder by an O-ring seal 20 and each head is sealed by a ring seal 21. The pistons and cylinders are preferably formed in steps of different diameters providing opposing annular shoulders 22, 23 for limiting axial movement of the pistons.

Each piston has a friction pad 24 on its face for engaging the face of the disc 3 and the limb 11 has a facing or friction pad 25 opposite the pad 24 for engaging the opposite face of the disc 3. For motivating the pistons, a fluid inlet 26 is provided in the head of cylinder 14 and a duct 27 connects the cylinders 13 and 14. Pressure is supplied to the cylinders by a pilot controlled valve (not shown) which connects the inlet 26 to a fluid pressure supply. Pressure applied to the cylinders causes the friction pads 24, 25 to embrace the disc 3, the brake member 5 being adapted to float on the studs 8, 9 to equalize the pressure.

Where the vehicle is to be parked for a period of time, the pressure fluid might leak from the cylinders releasing the brake. To provide for positively locking the disc, the disc 3 is formed about its periphery with a number of equally spaced locking notches 28. The brake member 5 is formed with a bore 29 in radial alignment with the disc 3. A guide bushing 30 is secured in the bore 29 and slidably receives a lock bolt 31 having a straight tapered end 32 for fitting a notch 28 of the disc. The notches 28 have their axial sides inclined to correspond with the tapered end of the bolt as this facilitates release of the lock bolt with less force than would be necessary with surfaces in true radial engagement.

The bolt may be operated by any desired mechanism for inserting it in or withdrawing it from the notches and for this purpose the bolt 31 has its outer end diametrically slotted as at 33 and a link 34 is pivotally secured therein by a cross-pin 35. The link may in turn be connected to an operative lever (not shown).

In the operation of the brake, the lock bolt 31 is normally withdrawn from engagement with the disc 3 and when the brake is to be applied, fluid under pressure is admitted to cylinders 13, 14 advancing the pistons and the friction pads therewith into frictional engagement with the disc. When the vehicle is to be parked the lock bolt 31 is advanced radially against the disc 3 and pressure on cylinders 13, 14 is momentarily released to allow the disc 3 to rotate enough to engage the lock bolt 31 in the nearest notch 28.

While a certain representative embodiment and details have been shown for the purpose of illustrating the invention, it will be apparent to those skilled in the art that various changes and modifications may be made therein without departing from the spirit or scope of the invention.

I claim:

A hydraulic brake comprising a single rotatable brake disc secured to a rotatable spindle to be braked, a non-rotatable brake member slidably mounted for floating movement axial of said disc but restrained against rotation with said disc, said non-rotatable member comprising a member C-shaped in cross section having limbs flanking opposite sides of the disc, one of said limbs having cylinder means formed therein and extending therethrough in a direction axial of the disc, a piston removably mounted for axial sliding movement in said cylinder means, friction pads opposed to said disc, one of said pads being mounted on a limb of said C-shaped member and the other being mounted opposite thereto on said piston, fluid pressure means for advancing said piston to frictionally engage the friction pads with the disc, locking mechanism for positively locking the same disc against rotation, said locking mechanism including a number of widely spaced V-shaped notches in the outer periphery of the disc, said notches having flat axially extending sides converging at an angle greater than the radial angle defined by the radially outer ends of said notches, and bolt means having a wedge-shaped end with a pair of flat converging sides complementary in shape to said notches radially engageable in said notches and locking the disc and the non-rotatable member against relative rotation at any floating position of said member.

References Cited in the file of this patent
UNITED STATES PATENTS

| | | |
|---|---|---|
| 2,360,646 | Carnagua | Oct. 17, 1944 |
| 2,534,432 | Frushour | Dec. 19, 1950 |
| 2,728,420 | Wright et al. | Dec. 27, 1955 |
| 2,790,516 | Wright et al. | Apr. 30, 1957 |
| 2,835,351 | Armstrong et al. | May 20, 1958 |
| 2,843,225 | Miller | July 15, 1958 |
| 2,844,224 | Bricker et al. | July 22, 1958 |
| 2,873,822 | Sloan | Feb. 17, 1959 |

FOREIGN PATENTS

| | | |
|---|---|---|
| 683,190 | Great Britain | Nov. 26, 1952 |